March 1, 1927.

A. F. SANFORD

RADIO APPARATUS 1,619,544

Original Filed Aug. 21, 1925    5 Sheets-Sheet 1

Inventor
Alfred F. Sanford
By Cyrus Kehr
Attorney

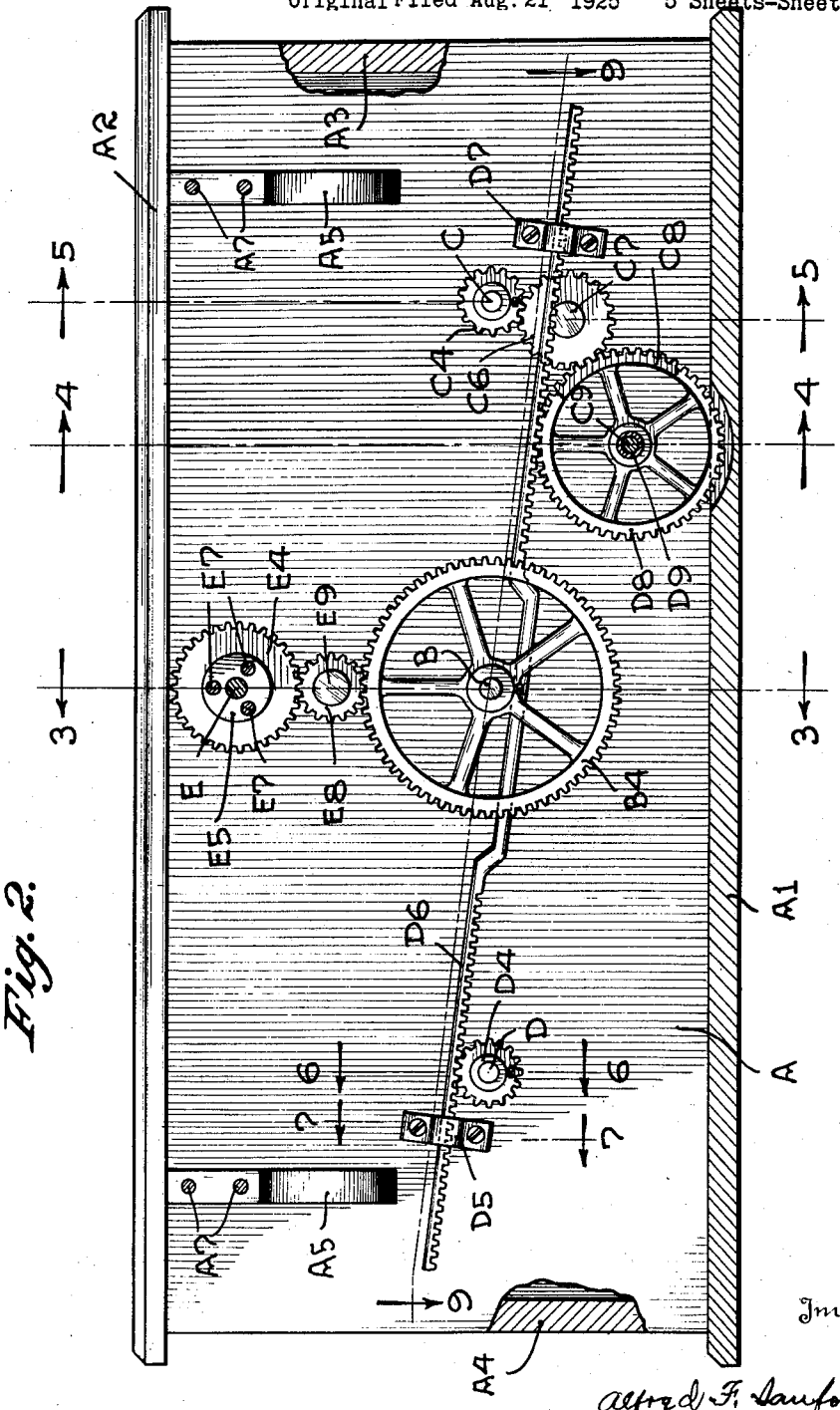

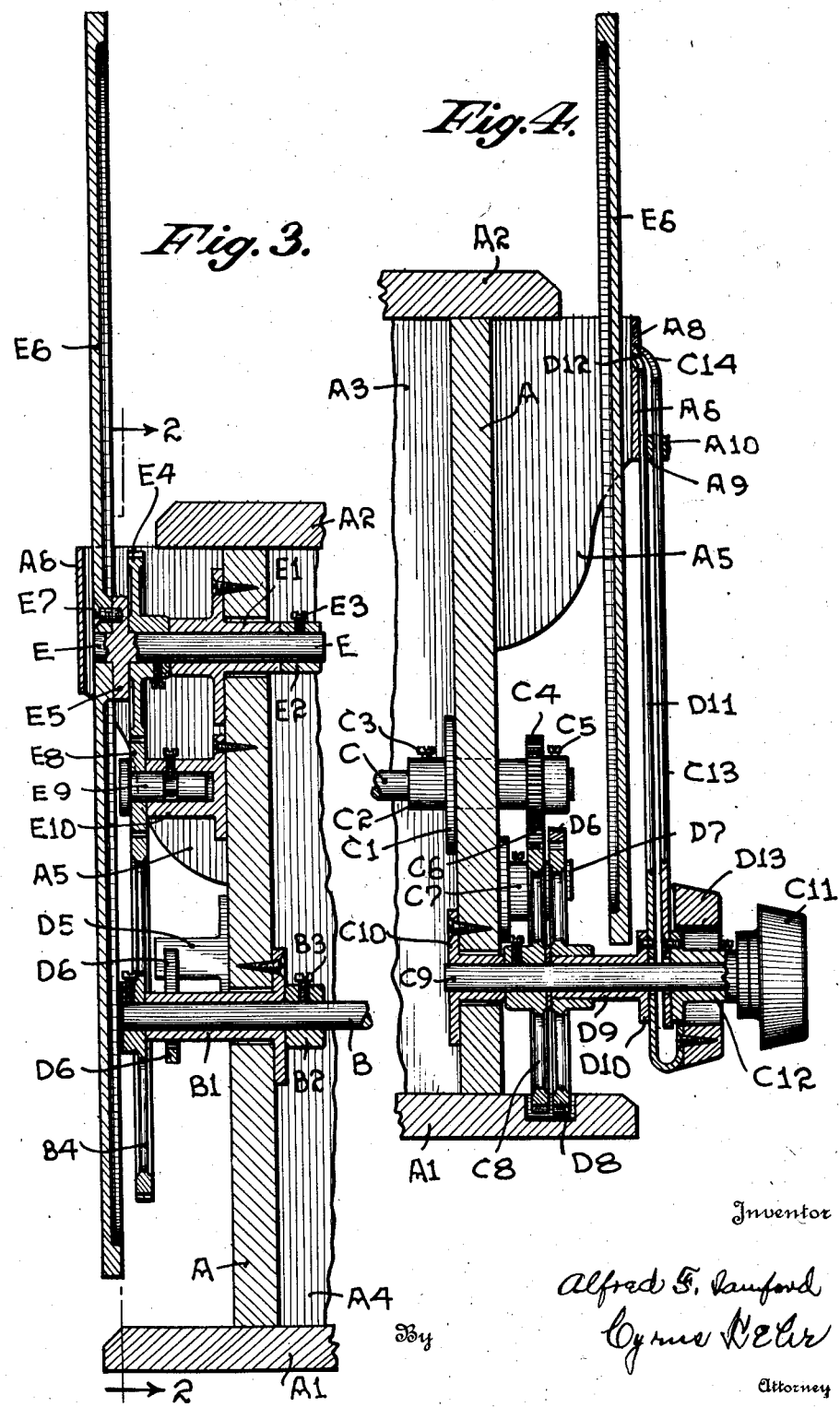

March 1, 1927. 1,619,544
A. F. SANFORD
RADIO APPARATUS
Original Filed Aug. 21, 1925   5 Sheets-Sheet 4
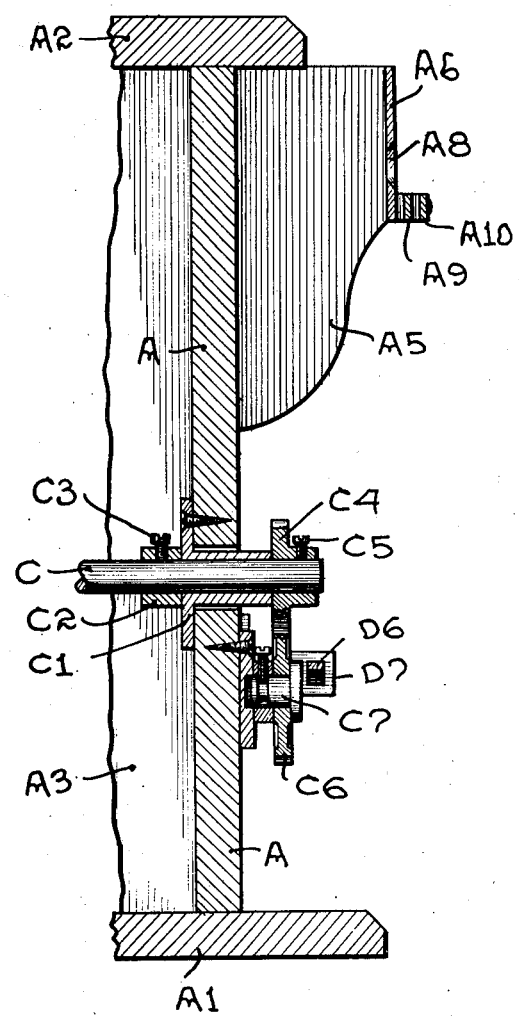
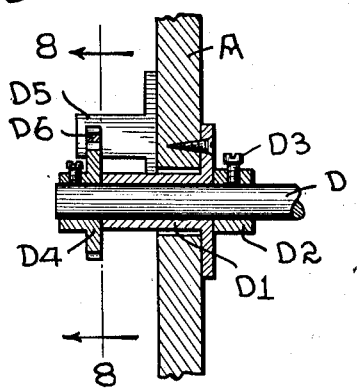
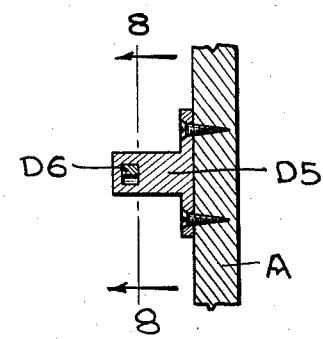

March 1, 1927.
A. F. SANFORD
RADIO APPARATUS
Original Filed Aug. 21, 1925   5 Sheets-Sheet 5
1,619,544
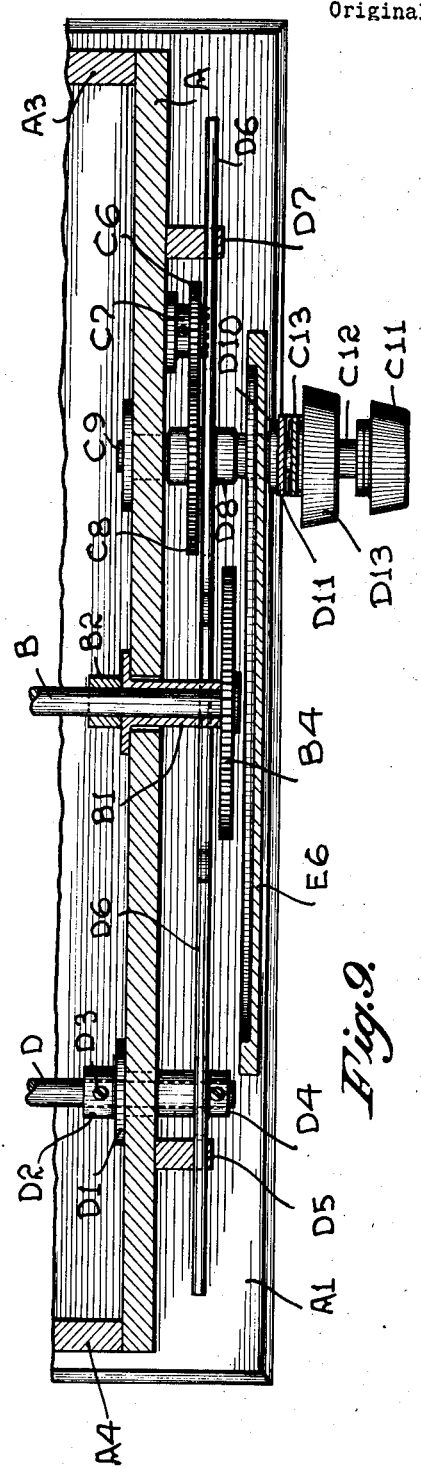
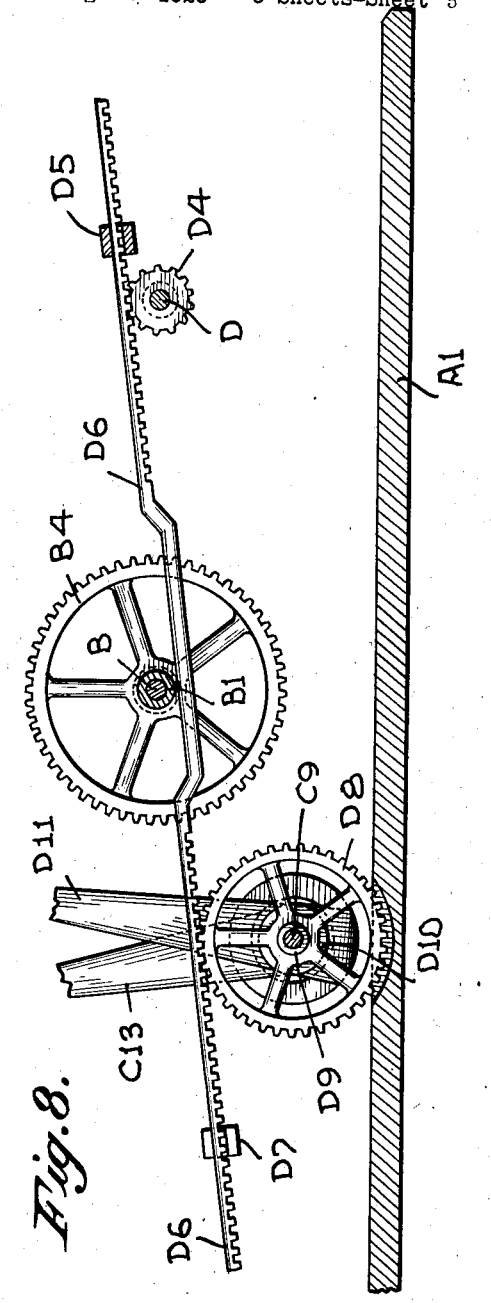
Inventor
Alfred F. Sanford
By Cyrus Kehr
Attorney Patented Mar. 1, 1927.

1,619,544

UNITED STATES PATENT OFFICE.

ALFRED F. SANFORD, OF KNOXVILLE, TENNESSEE.

RADIO APPARATUS.

Application filed August 21, 1925, Serial No. 51,637. Renewed October 7, 1926.

This improvement relates generally to apparatus intended to receive from radio sending stations, and particularly to radio-receiving apparatus in which provision is made for forming a record of positions of parts of the apparatus when those parts have been brought into tune with the sending apparatus at a chosen sending station.

This apparatus comprises three tuning shafts and a rotatable disc presenting a record-receiving surface and mechanism associated with the three tuning shafts and said disc, whereby the operator is guided in making a record on said disc after the three tuning shafts have been turned to bring them into tune with the apparatus at the sending station.

In the accompanying drawings,

Fig. 2 is an upright section parallel to and in front of the front wall of the apparatus, and on the line, 2—2, of Fig. 3, looking toward the right;

Fig. 3 is an upright section on the line, 3—3, of Figs. 1 and 2, looking toward the left;

Fig. 4 is an upright section on the line, 4—4, of Figs. 1 and 2, looking toward the right;

Fig. 5 is an upright section on the line, 5—5, of Figs. 1 and 2, looking toward the right;

Fig. 6 is an upright section on the line, 6—6, of Fig. 2, looking toward the left;

Fig. 7 is an upright section on the line, 7—7, of Fig. 2, looking toward the left;

Fig. 8 is an upright section on the line, 8—8, of Figs. 6 and 7, looking toward the left;

Fig. 9 is a section on the line, 9—9, of Fig. 2, looking in the direction of the arrow.

Figure 1:
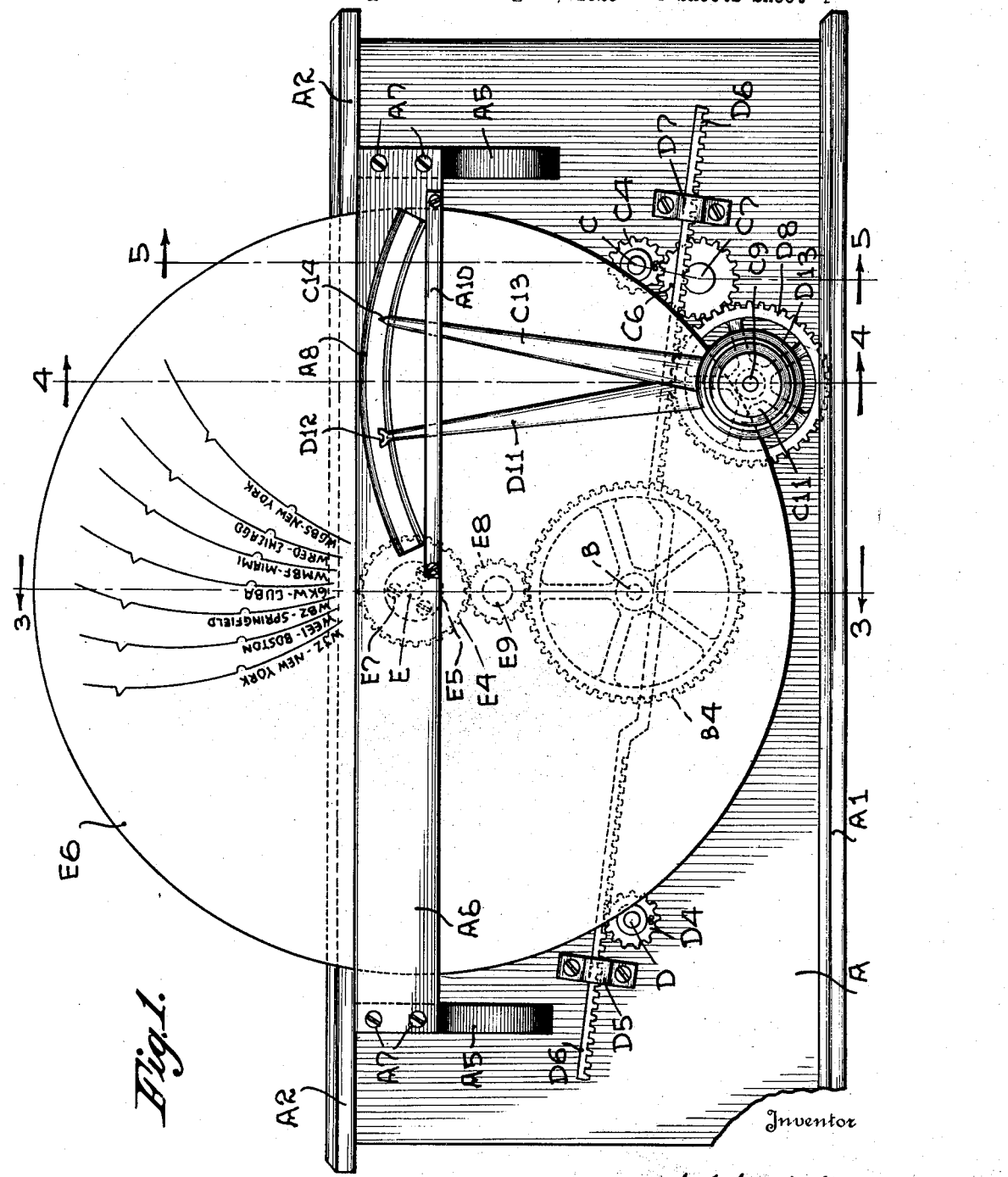
Fig. 1 is a front elevation of an apparatus embodying my improvement.

Referring to the drawings, A is the main front wall; $A^1$ is the base; $A^2$ is the top wall; $A^3$ is the right hand end wall; and $A^4$ is the left hand end wall.

Three tuning shafts, B, C and D, are arranged in the same horizontal plane and extend through the front wall, A, and project forward through that wall. The tuning shaft, B, rests in a bearing, $B^1$, which extends through the wall, A, and is fixed in said wall. At the rear of said bearing, a collar, $B^2$, surrounds said shaft and is fixed thereto by a set screw, $B^3$, and rests against said bearing. At the front of said bearing, the hub of a cog wheel, $B^4$, surrounds and is fixed to said shaft.

Above the shaft, B, is a horizontal transmission shaft, E, resting in a bearing, $E^1$, which extends through and is seated on the front wall, A. The rear end of said shaft extends through said bearing. A retaining collar, $E^2$, surrounds and is fixed to said shaft by a set screw, $E^3$, and rests against the adjacent end of said bearing. Immediately at the front of said bearing, the hub of a spur gear wheel, $E^4$, surrounds and is fixed to said shaft. Immediately at the front of said hub, the shaft, E, is expanded to form a small disc, $E^5$. On the outer face of said small disc is seated a large disc, $E^6$, said disc being centrally apertured to receive the adjacent end of the shaft, E. Screws, $E^7$, extend through the disc, $E^6$, into the disc, $E^5$, whereby the disc, $E^6$, is joined to the shaft, E, for rotation in unison. The spur gear wheel, $E^4$, meshes with a small idle spur gear wheel, $E^8$, which rotatably surrounds the fixed shaft, $E^9$, which rests in a horizontal bearing, $E^{10}$, which is supported on the front face of the wall, A. The wheel, $E^8$, meshes with the spur gear wheel, $B^4$, which as above stated, is fixed on the tuning shaft, B.

It will now be understood that the rim of the large disc, $E^6$, may be grasped by the hand of the operator for turning said disc with the shaft, E, in the bearing, $E^1$, and that turning of that shaft will cause the turning of the idle wheel, $E^8$, and the spur gear wheel, $B^4$, and the tuning shaft, B. The spur gear wheels, $E^4$ and $B^4$, are preferably of different sizes, the wheel, $E^4$, being the smaller, in order that the large disc, $E^6$, may undergo more than a half rotation during the half rotation usually imparted to such a tuning shaft. The ratio of the wheels, $E^4$ and $B^4$, as shown in the drawings, is two to one, in order that the large disc will make a full rotation during the half turn of the tuning shaft, B. The purpose of this is to make available a large record-receiving surface.

At the right and at the left of the disc, a bracket, $A^5$, extends forward from the front face of the front wall, A, a trifle forward of the plane of the front face of the disc. A face plate, $A^6$, extends horizontally across the front face of the disc and across the brackets, $A^5$, and is secured to said brackets by screws, $A^7$.

The tuning shaft, C, rests in a bearing, $C^1$, which extends through and is fixed in the front wall, A. At the rear of the bearing, $C^1$, a collar, $C^2$, surrounds the shaft, C, and is secured thereto by means of a set screw, $C^3$, and rests against the bearing, $C^1$. The shaft, C, projects forward far enough to be surrounded by the spur gear wheel, $C^4$. A set screw, $C^5$, binds said wheel to the shaft, C. (See Figs. 4 and 5.) The wheel, $C^4$, meshes with an idle spur gear wheel, $C^6$, which is held rotatably on the shaft, $C^7$, which is supported on the front face of the wall, A. The idle wheel, $C^6$, meshes with a larger spur gear wheel, $C^8$, which surrounds and is fixed to the rock shaft, $C^9$, which rests rotatably in the bearing, $C^{10}$, which is seated in the front wall, A. The shaft, $C^9$, extends forward beyond the disc, $E^6$. A hand knob, $C^{11}$, surrounds and is fixed to the outer end of the shaft, $C^9$.

Turning the knob, $C^{11}$, will cause the turning of the shaft, $C^9$, the spur gear wheel, $C^8$, the idle spur gear wheel, $C^6$, the spur gear wheel, $C^4$, and the tuning shaft, C.

The face plate, $A^6$, has a curved slot, $A^8$, concentric to the shaft, $C^9$. Below said slot is a retaining bar, $A^9$, which is spaced from the front face of the face plate. Parallel to and in front of and spaced from the bar, $A^9$, is a similar retaining bar, $A^{10}$. The hand knob, $C^{11}$, has a hub, $C^{12}$, to the rear face of which is secured a pointer, $C^{13}$, which extends upward through the space between the retaining bars, $A^9$ and $A^{10}$, said spaces being large enough to allow said pointer to freely move toward the right or toward the left, parallel to the face of the large disc, $E^6$. The pointer, $C^{13}$, is long enough to stand in front of the slot, $A^8$, and the upper end of the pointer is bent rearward to approach said slot.

The tuning shaft, D, rests in a bearing, $D^1$, which is seated in the front wall, A. At the rear of said bearing, said shaft is surrounded by a collar, $D^2$, which is secured by a set screw, $D^3$, and rests against the adjacent end of the bearing.

The forward end of the shaft, D, projects through said bearing. A spur gear wheel, $D^4$, surrounds and is fixed to the outer end of said shaft and rests against the bearing, $D^1$. A rack bar, $D^6$, extends slidably through a bracket, $D^5$, seated on the front face of the front wall, A, and across the wheel, $D^4$, and has its teeth directed downward into engagement with the teeth of said wheel. (See Figs. 2, 6 and 7.) Said bar extends rightward and slidably through the bracket, $D^7$, which is fixed on the front face of the wall, A, immediately at the right of the idle spur gear wheel, $C^6$. The downward-directed teeth of the bar, $D^6$, mesh with the spur gear wheel, $D^8$, which surrounds and is fixed to a sleeve, $D^9$, which loosely surrounds the rock shaft, $C^9$, at the front of the wheel, $C^8$. The front end of the sleeve, $D^9$, is expanded to form a disc, $D^{10}$. To that disc is attached a pointer, $D^{11}$, the lower part of which is flat and apertured to extend around the rock shaft. The upper end of said pointer extends between the inner bar, $A^9$, and the face plate, $A^6$, said space being large enough to allow the disc pointer to move rightward or leftward. The end of said pointer is provided with a notch, $D^{12}$, and said end is bent rearward into said slot, $A^8$. The upper end of the pointer, $C^{13}$, has a point, $C^{14}$. The lower end of the pointer, $D^{11}$, is extended forward and then upward to support a ring-form hand knob, $D^{13}$, surrounding and free from the hub, $C^{12}$, of the hand knob, $C^{11}$.

It will now be understood that partial turning the hand knob, $D^{13}$, to turn the sleeve, $D^9$, will cause the partial turning of the spur gear wheel, $D^8$, which will cause the endwise movement of the rack bar, $D^6$, which will cause a partial turning of the spur gear wheel, $D^4$, and the shaft, D.

The operation is as follows:—

To place this apparatus into tune with a chosen sending station, the tuning shafts, B, C and D, are to be turned until tuning has been attained. These shafts may be turned in any-order desired by the operator. We will suppose that the shaft, B, is to be tuned first. For this, the operator engages the edge of the large disc, $E^6$, and turns that disc until the shaft, B, has been turned into the required position. Then the shaft, C, is turned by engaging either the hand knob, $C^{11}$, or the pointer, $C^{13}$, and turning the engaging member toward the right or left, whereby the gear wheels, $C^8$, $C^6$, $C^4$, and the tuning shaft, C, are turned, until that shaft is in the desired position.

Then the hand of the operator engages either the hand knob, $D^{13}$, or the pointer, $D^{11}$, and turns that member toward the right or left, whereby the spur gear wheel, $D^8$, will cause the endwise movement of the rack bar, $D^6$, whereby the spur gear wheel, $D^4$, and the tuning shaft, D, are turned until the shaft, D, is in the desired position. Usually it will be better to engage the pointers than the corresponding hand knobs. When one pointer has been put into position, it may be held immovably while the other is moved into position. Thus movement of the first pointer by frictional engagement with adjacent parts is avoided.

When the three shafts have thus been brought into tuning position, the operator takes a pencil or other writing instrument and uses the curved face plate edge at the lower part of the slot, $A^8$, as a guide, passing the pencil along said edge and across the ends of the pointers. The upper end of the pointer, $D^{11}$, will cause a downward fold or notch in the pencil line, and the upper end of the pointer, $C^{13}$, will cause an inverted V-form fold of the line drawn by the pencil. Then symbols identifying the sending station are written on the disc, $B^6$, in the slot, $A^8$. The record thus made may include the initials and name and meter length of that sending station.

When this apparatus is to be brought into tune with another sending station, the large disc, $E^6$, and the pointers, $C^{13}$ and $D^{11}$, (or the corresponding hand knobs) are turned until the associated tuning shafts are in tune with that sending station. Then a record is placed as before on the part of the front face of the disc, $E^6$, which is expanded through the slot, $A^8$.

When this apparatus is again to be brought into tune with the first sending station, the disc, $E^6$, is turned until the record of that station again appears in the slot, $A^8$. Then the two pointers are turned to bring their ends opposite the part of that record previously made by the aid of those pointers.

It is to be understood that the records may be placed directly on the disc, $E^6$, or on a sheet of paper or similar material temporarily placed on the face of the disc.

I claim as my invention:

1. In an apparatus of the kind described, the combination of two tuning shafts, a movable member bearing a record-receiving surface, gearing connecting said member and one of said shafts, a stationary guide, a guide movable along the stationary guide, a rocking member supporting the movable guide, and means operatively connecting the rocking member with the other tuning shaft, substantially as described.

2. In an apparatus of the kind described, the combination of two tuning shafts, a movable member bearing a record-receiving surface, gearing connecting said member and one of said shafts, a stationary guide, a guide movable along the stationary guide, a rocking member supporting the movable guide, and cog gearing operatively connecting the rocking member with the other tuning shaft, substantially as described.

3. In an apparatus of the kind described, the combination of two tuning shafts, a movable member bearing a record-receiving surface, gearing connecting said member and one of said shafts, a stationary guide, a guide movable along the stationary guide, a rocking member supporting the movable guide, and means including a rack-bar operatively connecting the rocking member with the other tuning shaft, substantially as described.

4. In an apparatus of the kind described, the combination of a tuning shaft, a movable member bearing a record-receiving surface, gearing connecting said member and said shaft, two other tuning shafts, a stationary guide, two guides movable along the stationary guide, two rocking members, one supporting one and the other supporting the other of the movable guides, and means connecting one of the rocking members with one of said two tuning shafts, and means connecting the other of the rocking members with the other of said two tuning shafts, substantially as described.

5. In an apparatus of the kind described, the combination of a tuning shaft, a movable member bearing a record-receiving surface, gearing connecting said member and said shaft, two other tuning shafts, a stationary guide, two guides movable along the stationary guide, two rocking members on a common axial line one supporting one and the other supporting the other of the movable guides, and means connecting one of the rocking members with one of said two tuning shafts, and means connecting the other of the rocking members with the other of said two tuning shafts, substantially as described.

6. In an apparatus of the kind described, the combination of two tuning shafts, a rotatable member bearing a record-receiving surface, gearing connecting said member and one of said shafts, a stationary guide, a guide movable along the stationary guide, a rocking member supporting the movable guide, and means operatively connecting the rocking member with the other tuning shaft, substantially as described.

7. In an apparatus of the kind described, the combination of two tuning shafts, a rotatable member bearing a record-receiving surface, gearing connecting said member and one of said shafts, a stationary guide, a guide movable along the stationary guide, a rocking member supporting the movable guide, and cog gearing operatively connecting the rocking member with the other tuning shaft, substantially as described.

8. In an apparatus of the kind described, the combination of two tuning shafts, a rotatable member bearing a record-receiving surface, gearing connecting said member and one of said shafts, a stationary guide, a guide movable along the stationary guide, a rocking member supporting the movable guide, and means including a rack-bar operatively connecting the rocking member with the other tuning shaft, substantially as described.

9. In an apparatus of the kind described, the combination of a tuning shaft, a rotatable member bearing a record-receiving surface, gearing connecting said member and said shaft, two other tuning shafts, a stationary guide, two guides movable along the stationary guide, two rocking members one supporting one and the other supporting the other of the movable guides, and means connecting one of the rocking members with one of said two tuning shafts, and means connecting the other of the rocking members with the other of said two tuning shafts, substantially as described.

10. In an apparatus of the kind described, the combination of a tuning shaft, a rotatable member bearing a record-receiving surface, gearing connecting said member and said shaft, two other tuning shafts, a stationary guide, two guides movable along the stationary guide, two rocking members on a common axial line one supporting one and the other supporting the other of the movable guides, and means connecting one of the rocking members with one of said two tuning shafts, and means connecting the other of the rocking members with the other of said two tuning shafts, substantially as described.

11. In an apparatus of the kind described, the combination of two tuning shafts, a movable member bearing a record-receiving surface, gearing connecting said member and one of said shafts, a stationary guide and rocking member, a pointer supported by said rocking member and reaching to the recording guide, a gear wheel concentric with and fixed to the rocking member, a rack bar intervening said gear wheel and the other tuning shaft, whereby the rocking of said pointer and said rocking member will cause the endwise movement of the rack bar and through the latter cause the turning of the other tuning shaft, substantially as described.

12. In an apparatus of the kind described, the combination of two tuning shafts, a movable member bearing a record-receiving surface, gearing connecting said member and one of said shafts, a stationary guide, a retaining member, a rocking member, a pointer supported by said rocking member and reaching between the guide and the retaining member, a gear wheel concentric with and fixed to the rocking member, a rack bar intervening said gear wheel and the other tuning shaft, whereby the rocking of said pointer and said rocking member will cause the endwise movement of the rack bar and through the latter cause the turning of the other tuning shaft, substantially as described.

13. In an apparatus of the kind described, the combination of a tuning shaft, a movable member bearing a record-receiving surface, means connecting said member and said shaft, a stationary guide, two pointers reaching to the recording guide and each supported on a rocking member, said rocking members being on the same axial line, two other tuning shafts, gearing intervening one of the rocking members and one of said two tuning shafts and gearing intervening the other of said rocking members and the other of said two tuning shafts, substantially as described.

14. In an apparatus of the kind described, the combination of a tuning shaft, a movable member bearing a record-receiving surface, means connecting said member and said shaft, a stationary guide, two rocking members on the same axial line, two pointers reaching to the guide and each being supported on one of the rocking members, two other tuning shafts, gearing intervening one of the rocking members and one of said two tuning shafts and gearing intervening the other of said rocking members and the other of said two tuning shafts, substantially as described.

15. In an apparatus of the kind described, the combination of two tuning shafts, a movable member bearing a record-receiving surface having an orbital path, gearing connecting said member and one of said shafts, a stationary guide adjacent said record-receiving surface, a pointer movable along the stationary guide, a rocking member supporting the movable pointer, and means operatively connecting the rocking member with the other tuning shaft, substantially as described.

16. In an apparatus of the kind described, the combination of two tuning shafts, a movable member bearing a record-receiving surface having an orbital path, gearing connecting said member and one of said shafts to cause said member to traverse said path at a velocity greater than the turning velocity of said tuning shaft, a stationary guide adjacent said record-receiving surface, a pointer movable along the stationary guide, a rocking member supporting the movable pointer, and means operatively connecting the rocking member with the other tuning shaft, substantially as described.

17. In an apparatus of the kind described, the combination of two tuning shafts, a movable member bearing a record-receiving surface having an orbital path, gearing connecting said member and one of said shafts to cause said member to traverse said path at twice the velocity of said tuning shaft, a stationary guide adjacent said record-receiving surface, a pointer movable along the stationary guide, a rocking member supporting the movable pointer, and means operatively connecting the rocking member with the other tuning shaft, substantially as described.

18. In an apparatus of the kind described, the combination of two tuning shafts, a rotatable disc bearing a record-receiving surface, gearing connecting said disc and one of said shafts for rotating the disc faster than the rotation of said shaft, a stationary guide adjacent said disc, a pointer movable along the stationary guide, a rocking member supporting the pointer, and means operatively connecting the rocking member with the other tuning shaft, substantially as described.

19. In an apparatus of the kind described, the combination of two tuning shafts, a movable member bearing a record-receiving surface, two guides movable independently of each other along the record-receiving surface transversely to the course of movement of the adjacent part of said surface, a rocking member supporting one of said guides, another rocking member supporting the other of said guides, means connecting one of said rocking members with one of said tuning shafts, and means connecting the other of said rocking members with the other of said tuning shafts, substantially as described.

20. In an apparatus of the kind described, the combination of two tuning shafts, a rotatable member bearing a record-receiving surface, two guides movable independently of each other along the record-receiving surface transversely to the course of movement of the adjacent part of said surface, a rocking member supporting one of said guides, another rocking member supporting the other of said guides, means connecting one of said rocking members with one of said tuning shafts, and means connecting the other of said rocking members with the other of said tuning shafts, substantially as described.

21. In an apparatus of the kind described, the combination of two tuning shafts, a movable member bearing a record-receiving surface, means connecting said member and one of said shafts, a guide movable along and transversely to the movement of said record member, a rocking member in operative relation with said guide, and means operatively connecting the rocking member with the other tuning shaft, substantially as described.

In testimony whereof I have signed my name, this 18th day of August, in the year one thousand nine hundred and twenty-five.

ALFRED F. SANFORD.